United States Patent
Lee et al.

(10) Patent No.: US 7,648,652 B2
(45) Date of Patent: Jan. 19, 2010

(54) POLYMER ELECTROLYTE AND FUEL CELL EMPLOYING THE SAME

(75) Inventors: Myung-jin Lee, Yongin-si (KR);
Myung-dong Cho, Hwaseong-si (KR);
Hee-young Sun, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 625 days.

(21) Appl. No.: 11/298,576

(22) Filed: Dec. 12, 2005

(65) Prior Publication Data

US 2006/0127727 A1    Jun. 15, 2006

(30) Foreign Application Priority Data

Dec. 11, 2004    (KR) .................. 10-2004-0104622

(51) Int. Cl.
*H01B 1/12*    (2006.01)

(52) U.S. Cl. ................... 252/500; 429/30; 528/391

(58) Field of Classification Search .............. 252/500; 429/30, 33; 528/391
See application file for complete search history.

(56) References Cited

U.S. PATENT DOCUMENTS

| | | | |
|---|---|---|---|
| 5,438,082 A * | 8/1995 | Helmer-Metzmann et al. | 522/149 |
| 5,525,436 A | 6/1996 | Savinell | |
| 5,965,300 A * | 10/1999 | Lee et al. | 429/314 |
| 6,248,469 B1 | 6/2001 | Formato et al. | |
| 7,202,327 B2 * | 4/2007 | Haring et al. | 528/391 |
| 2004/0054125 A1 * | 3/2004 | Schindler et al. | 528/391 |
| 2004/0131910 A1 | 7/2004 | Bauer | |
| 2005/0118480 A1 * | 6/2005 | Bauer et al. | 429/33 |

FOREIGN PATENT DOCUMENTS

| | | |
|---|---|---|
| JP | 10-283839 | 10/1998 |
| JP | 2000-080166 | 3/2000 |
| JP | 2003-528188 | 9/2003 |
| JP | 2003-346839 | 12/2003 |
| KR | 10-2003-0035190 | 5/2003 |
| KR | 10-2004-0031161 | 4/2004 |
| WO | 2004/027909 | 4/2004 |

OTHER PUBLICATIONS

Swier et al "Morphology control of sulfonated poly(ether ketone ketone) poly(ether idide) blends . . . ", Journal of Membrane Science 270 (2006) 22-31.*

Li et al "Direct Synthesis of Disulfonated Poly(arylene ehter ketone(s) and Investigation of their Behavior as Proton Exchange Membrane (PEM)", Prepr. Pap-Am. CHem. Soc., Div. Fuel Chem. 2004, 49(2), 536-37.*

Li et al "Novel Sulfonated Poly(ether ether ketone ketone) Derived from Bisphenol S", Journal of Applied Polymer Scince, VOl. 94, 1569-1574 (2004).*

* cited by examiner

*Primary Examiner*—Mark Kopec
(74) *Attorney, Agent, or Firm*—H.C. Park & Associates, PLC (57) ABSTRACT

A polymer electrolyte that may be used in a fuel cell includes sulfonated polyether ketone ketone and a cross-linking agent.

4 Claims, 5 Drawing Sheets

POLYMER ELECTROLYTE AND FUEL CELL EMPLOYING THE SAME

CROSS REFERENCE TO RELATED APPLICATION

This application claims priority to and the benefit of Korean Patent Application No. 10-2004-0104622, filed on Dec. 11, 2004, which is hereby incorporated by reference for all purposes as if fully set forth herein.

BACKGROUND OF THE INVENTION

1. Field of the Invention

The present invention relates to a polymer electrolyte and a fuel cell employing the same, and more particularly, to a polymer electrolyte that has a high ionic conductivity at high temperatures and a fuel cell employing the same.

2. Discussion of the Background

Fuel cells may be classified according to the electrolyte used in the fuel cell. The types of fuel cells include polymer electrolyte membrane fuel cells (PEMFCs), phosphoric acid fuel cells (PAFCs), molten carbonate fuel cells (MCFCs), and solid oxide fuel cells (SOFCs). The working temperatures of the fuel cells and their constituent materials vary depending on the type of electrolyte used in a cell.

The basic PEMFC includes an anode (fuel electrode), a cathode (oxidizing agent electrode), and a polymer electrolyte membrane interposed between the anode and the cathode. The anode includes a catalyst layer to promote the oxidation of a fuel and the cathode includes a catalyst layer to promote the reduction of an oxidizing agent.

Examples of fuel that may be supplied to the anode include hydrogen, a hydrogen-containing gas, a mixture of methanol vapor and water vapor, and an aqueous methanol solution. Examples of the oxidizing agent supplied to the cathode include oxygen, oxygen containing gas, and air.

In the anode of the PEMFC, fuel is oxidized to produce protons and electrons. The protons migrate to the cathode through an electrolyte membrane and the electrons migrate to an external circuit (load) through a conductive wire (or current collector). In the cathode of the PEMFC, oxygen reacts with the migrated protons and electrons, which are supplied from the external circuit through another conductive wire (or current collector), to produce water. The migration of electrons from the anode to the cathode via the external circuit provides electrical power.

The polymer electrolyte membrane acts as an ionic conductor for the migration of protons from the anode to the cathode and also acts as a separator for preventing contact between the anode and the cathode. Therefore, the polymer electrolyte membrane properties should include sufficient ionic conductivity, electrochemical safety properties, high mechanical strength, thermal stability at the operating temperature of the fuel cell, and should be easily formed into a thin layer.

A conventional polymer electrolyte membrane may be composed of a sulfonated perfluorinated polymer that has fluorinated alkylene in the backbone and sulfonic acid groups at the terminal position of fluorinated vinylether side chains, such as NAFION manufactured by Dupont. This type of polymer electrolyte membrane should contain a proper amount of water to have sufficient ionic conductivity.

However, a conventional polymer electrolyte membrane has a seriously lowered ionic conductivity at operating temperatures of about 100° C. or higher due to loss of moisture by evaporation, and at temperatures of about 100° C. or higher, it may not act as an ionic conductor. Thus, it is difficult to operate a PEMFC using a conventional polymer electrolyte membrane under atmospheric pressure at about 100° C. or higher. Conventional PEMFCs have been operated at about 100° C. or lower, for example, at about 80° C.

Various methods have been proposed to raise the operating temperature of a PEMFC to 100° C. or higher, including a method providing a PEMFC with a humidification apparatus, a method operating a PEMFC under pressurized conditions, and a method using a polymer electrolyte that does not require humidification.

When a PEMFC is operated under pressurized conditions, the boiling point of water increases, which can raise the operating temperature. Additionally, the use of a pressurizing system or a humidification apparatus increases the size and weight of the PEMFC and reduces the efficiency of the power generating system. Therefore, a need exists for a polymer electrolyte membrane that has a high ionic conductivity even at a relative humidity of about 0%.

Examples of polymer electrolyte membranes that do not require humidity include polybenzoimidazole (PBI), and polybenzoimidazole doped with sulfuric acid or phosphoric acid, which are disclosed in Japanese Patent Laid-Open Publication No. Hei 11-503262.

The thermal and chemical stability of an electrolyte membrane composed of PBI is good at high temperatures, but phosphoric acid impregnated in the electrolyte may leak from the cell when the cell is used for long periods.

U.S. published patent application 20040131910A discloses a method of preparing sulfonated polyether ketone ketone using a diphenyl ether and a benzenedicarboxylic acid derivative and use of the sulfonated polyether ketone ketone prepared thereby as a membrane for fuel cells.

SUMMARY OF THE INVENTION

The present invention provides a polymer electrolyte that maintains a high ionic conductivity even at a relative humidity of about 0% by preventing the leakage of phosphoric acid impregnated in its polymer matrix, a method of preparing the polymer electrolyte, and a fuel cell that includes the polymer electrolyte.

Additional features of the invention will be set forth in the description which follows, and in part will be apparent from the description, or may be learned by practice of the invention.

The present invention discloses a polymer electrolyte including sulfonated poly (ether ketone ketone) (SPEKK) represented by Formula (1) and a cross-linking agent:

Formula (1)

where n is a number from 100 to 1,000.

The present invention also discloses a method of preparing a polymer electrolyte, including: dissolving SPEKK represented by Formula (1) in a solvent to obtain a SPEKK solution, adding a cross-linking agent dropwise to the SPEKK solution, adding a polymerization initiator, stirring the resulting mixture, and curing the resultant.

The present invention also discloses a fuel cell including a cathode, an anode, and the polymer electrolyte interposed between the cathode and the anode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

A polymer electrolyte according to an exemplary embodiment of the present invention includes a porous product obtained by a curing reaction between sulfonated polyether ketone ketone (SPEKK) represented by Formula (1) and a cross-linking agent.

Formula (1)

where n is a number from 100 to 1,000.

The porous product may be doped with an acid such as phosphoric acid or a solid inorganic proton conductor. The solid inorganic proton conductor may be $Zr(HPO_4)_2$ hydrate, $ZrO_2$ hydrate, $SnO_2$ hydrate, $WO_3$ hydrate, phosphomolibdic acid ($H_3[PMo_{12}O_{40}]29H_2O$), phosphotungstic acid ($H_3PW_{12}O_{40}29H_2O$), $SnP_2O_7$, or $BPO_4$.

The hydrophilic groups of a cross-linking agent, such as the —OH functional group of ethyleneglycol in PEGDMA, may be introduced into SPEKK through the curing reaction between the SPEKK and the cross-linking agent. This process strengthens the interaction between SPEKK and phosphoric acid and provides an increased ionic conductivity at higher temperatures compared to a conventional polymer electrolyte made of PBI/phosphoric acid and prevents a decrease in the ionic conductivity over time.

The SPEKK represented by Formula (1) may be synthesized by sulfonating polyether ketone ketone (PEKK) with a mixture of sulfuric acid and fuming sulfuric acid (30% free $SO_3$) as shown in Reaction Scheme 1:

Reaction Scheme 1 where n is a number from 100 to 1,000.

The mixing ratio of sulfuric acid and fuming sulfuric acid used may vary according to the reaction temperature, but may be in the range of about 50:50 to about 60:40 (v/v), and may be about 57:43 (v/v) at room temperature. The reaction time used may vary according to the mixing ratio of sulfuric acid and fuming sulfuric acid and the desired degree of sulfonication of the SPEKK, but may be in the range of about 42 to about 72 hours.

After completing the sulfonation, the reaction mixture may be added dropwise into excessive volumes of rapidly stirred deionized ice water to form a precipitate. The precipitate may be filtered and washed with water to remove excessive acid, and then dried to obtain SPEKK. The drying temperature may be in the range of about 60° C. to about 120° C.

The degree of sulfonication of the SPEKK produced may be identified by an elemental analysis, and may be about 30% to about 40%, and preferably may be about 33%. The weight average molecular weight of the SPEKK may be about 40,000 g/mol to about 400,000 g/mol, and preferably may be about 60,000 g/mol to about 200,000 g/mol.

The cross-linking agent used in the present invention may improve the mechanical properties of a polymer electrolyte. Examples of the cross-linking agent include polyethyleneglycol methacrylate (PEGMA) $\{H_2C=C(CH_3)-C(=O)-(OCH_2CH_2)_k-OH$, in which k is an integer of 1 to 25$\}$, polyethyleneglycol dimethacrylate (PEGDMA) $\{H_2C=C(CH_3)-C(=O)-(OCH_2CH_2)_n-OC(=O)-C(CH_3)=CH_2$, in which n is an integer of 1 to 25$\}$, polyethyleneglycol dimethyl ether (PEGDME) $\{H_3C-(OCH_2CH_2)_m-OCH_2$, in which m is an integer of 1 to 25$\}$, polyethyleneglycol diacrylate, and the like.

The amount of the cross-linking agent may be about 80 to about 250 parts by weight based on 100 parts by weight of the SPEKK. When the amount of the cross-linking agent is less than about 80 parts by weight, sufficient cross-linking may not occur. When the amount of the cross-linking agent is greater than about 250 parts by weight, the polymers may become excessively cross-linked, which interferes with proton movement, thereby resulting in a decrease in the ionic conductivity.

A method of preparing the polymer electrolyte according to an exemplary embodiment of the present invention will now be described in greater detail.

SPEKK is dissolved in a solvent to prepare a SPEKK solution. Dichloroacetic acid may be used as the solvent. The amount of the solvent used may be about 400 to about 1,000 parts by weight based on 100 parts by weight of the SPEKK. When the solvent amount is less than about 400 parts by weight, the SPEKK may not dissolve sufficiently. When the solvent amount is greater than 1,000 parts by weight, the viscosity of the solution decreases, which is disadvantageous in the formation of a film.

A cross-linking agent may be added dropwise into the SPEKK solution obtained, and a polymerization initiator may be added and stirred to prepare a polymer electrolyte forming composition. The composition is applied to a substrate, and then may be exposed to light, heat or an electron beam to cure the composition. The composition may be applied to a substrate by spin coating, casting, and other application methods. The substrate may be made of glass, MYLAR film, or the like.

The polymer electrolyte forming composition may further include an acid, such as phosphoric acid. The acid amount may be about 3 to about 12 mol % based on the SPEKK. When the acid amount is less than about 3 mol %, the ionic conductivity may be low. When the acid amount is greater than about 12 mol %, the mechanical properties of a membrane may be poor.

The acid may be added prior to applying the composition to a substrate, or an electrolyte membrane may be prepared and then doped with acid by immersion.

The polymerization initiator may be a thermal polymerization initiator capable of initiating polymerization by applying heat, a photo polymerization initiator capable of initiating polymerization by applying light, or a polymerization initiator capable of initiating polymerization by applying an electron beam. The photopolymerization initiator may be benzoin ethyl ether, diethoxyacetophenone, benzyl dimethyl ketal, or the like. The thermal polymerization initiator may be 2.2'-azobisisobutyronitrile, or the like.

The amount of the polymerization initiator may be about 1 to about 30 parts by weight based on 100 parts by weight of the SPEKK. When the amount of the polymerization initiator is outside of the above range, the reactivity of the curing reaction may be unsatisfactory.

When the curing reaction is initiated by heat, the temperature may be about 40° C. to about 90° C. When the curing is initiated by light, ultraviolet rays may be used.

A drying operation may be performed before curing the solution. The drying temperature may be about 100° C. to about 120° C.

The cured polymer electrolyte membrane may be peeled off the substrate to obtain a polymer electrolyte according to an exemplary embodiment of the present invention. The polymer electrolyte may thus be composed of the product of a curing reaction of SPEKK, the cross-linking agent, and the acid. The acid amount may be about 3 to about 12 mol % based on the product of the curing reaction between the SPEKK and the cross-linking agent.

The polymer electrolyte may be used as a polymer electrolyte membrane interposed between a cathode and an anode to form a membrane/electrode assembly in a fuel cell.

The cathode and anode may include a gas diffusion layer and a catalyst layer. The catalyst layer may include a metal catalyst to promote the relevant reactions (oxidation of hydrogen and reduction of oxygen). The catalyst layer may include at least one catalyst selected from the group of Pt, Ru, Os, a Pt—Ru alloy, a Pt—Os alloy, a Pt—Pd alloy and a Pt-M alloy (where M is at least one transition metal selected from the group consisting of Ga, Ti, V, Cr, Mn, Fe, Co, Ni, Cu and Zn). The catalyst layer may include at least one catalyst selected from the group of Pt, Ru, Os, a Pt—Ru alloy, a Pt—Os alloy, a Pt—Pd alloy, a Pt—Co alloy and a Pt—Ni alloy.

The metal catalyst may be impregnated onto a support. The support may be carbon, such as acetylene black or graphite, or inorganic particulates, such as alumina, or silica. Noble metal catalysts on a support are commercially available or may be prepared by impregnating the support with a noble metal.

The gas diffusion layer may be made of carbon paper or carbon cloth. The gas diffusion layer may support an electrode of a fuel cell and may diffuse a reaction gas into the catalyst layer. The gas diffusion layer may be made of carbon paper or carbon cloth that has been treated to be water repellent with a fluorine-based resin such as polytetrafluoroethylene to prevent the reduction of gas diffusion efficiency due to water produced during the operation of the fuel cell.

The electrodes may further include a microporous layer between the gas diffusion layer and the catalyst layer to further enhance the gas diffusion effect. The microporous layer may be formed by applying a composition including a conducting material, a binder, and if necessary, an ionomer. The conducting material may be carbon powder, carbon black, activated carbon or acetylene black. The binder may be polytetrafluoroethylene.

Figure 1:
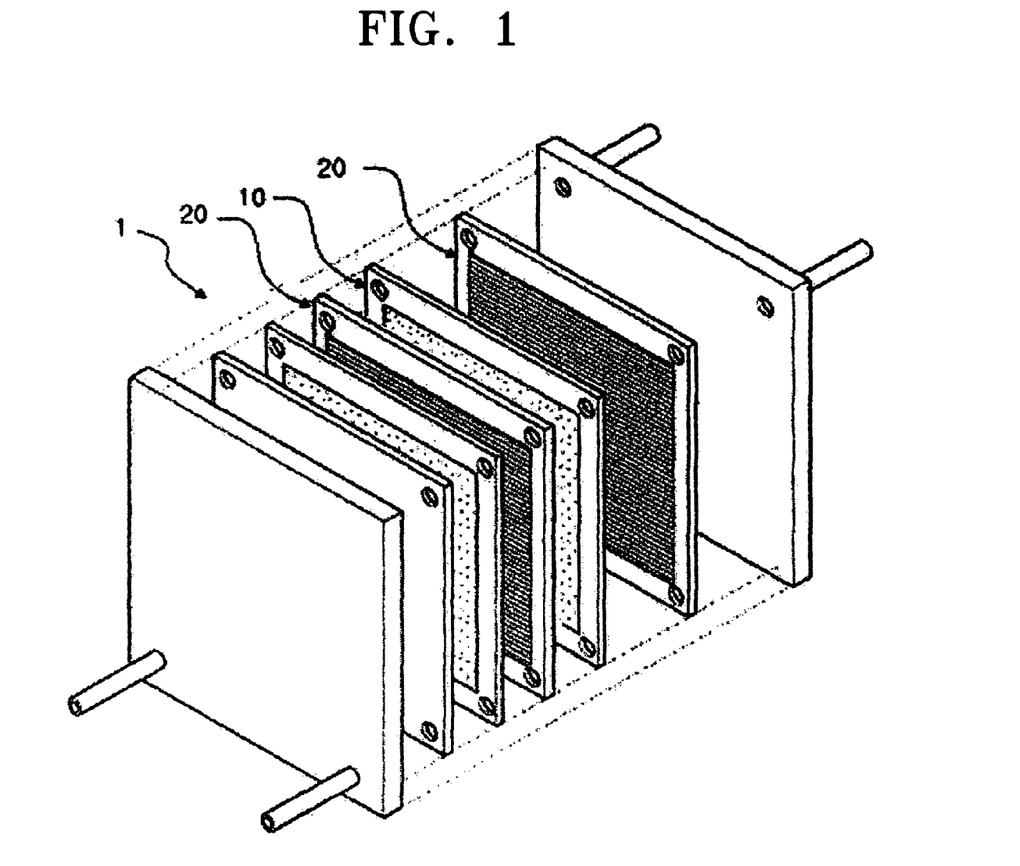
FIG. 1 shows an exploded perspective view of a fuel cell stack including a polymer electrolyte membrane according to an exemplary embodiment of the present invention.

A fuel cell according to an exemplary embodiment of the present invention may include a fuel cell stack 1 that includes a membrane-electrode assembly (MEA), as shown in FIG. 1. FIG. 1 is an exploded perspective view of a fuel cell stack 1. The MEA 10 may include electrodes disposed on both sides of a polymer electrolyte membrane, at least one electricity generation part that includes separators 20 disposed on both sides of the MEA and generates electricity through the electrochemical reaction of hydrogen and oxygen, a fuel supply part that supplies a hydrogen-containing fuel to the electricity generation part, and an oxygen supply part that supplies oxygen to the electricity generation part.

Separators 20 may be disposed on both sides of the MEA to form at least one electricity generation part in the form of a stack that generates electricity through the electrochemical reaction of hydrogen and oxygen by supplying fuel and oxygen to the catalyst layer.

The electricity generation part may include the polymer electrolyte membrane, electrodes disposed on both sides of the polymer electrolyte membrane, and bipolar plates. The electricity generation part generates electricity through the electrochemical reaction of hydrogen and oxygen.

The fuel supply part supplies a hydrogen-containing fuel to the electricity generation part and the oxygen supply part supplies the electricity generation part with oxygen.

The fuel cell of the present invention may be a phosphoric acid fuel cell (PAFC), a polymer electrolyte membrane fuel cell (PEMFC), or an alkaline fuel cell.

The present invention will now be described in greater detail with reference to the following examples. The following examples are for illustrative purposes only and are not intended to limit the scope of the invention.

SYNTHESIS EXAMPLE 1

Preparation of the Spekk 50 g of PEKK was added to 950 g of a mixture of 57:43 (v/v) sulfuric acid and fuming sulfuric acid (30% free $SO_3$) and reacted at room temperature for 42 hours.

Next, the reaction mixture was added dropwise into excessive volumes of rapidly stirred deionized ice water to form a precipitate.

The precipitate was filtered and washed with deionized water to remove excessive sulfuric acid. The resultant was dried at 110° C. for 3 days to obtain SPEKK. The weight average molecular weight of SPEKK according to Synthesis Example 1 is 107,000, and n is about 265.

SYNTHESIS EXAMPLE 2

Preparation of the Spekk

SPEKK was obtained in the same manner as in Synthesis Example 1, except that PEKK and the mixture of sulfuric acid and fuming sulfuric acid were reacted for 56 hours. The weight average molecular weight of SPEKK according to Synthesis Example 2 is 107,900, and n is about 265.

SYNTHESIS EXAMPLE 3

Preparation of the Spekk

SPEKK was obtained in the same manner as in Synthesis Example 1, except that PEKK and the mixture of sulfuric acid and fuming sulfuric acid were reacted for 72 hours. The weight average molecular weight of SPEKK according to Synthesis Example 3 is 109,000, and n is about 265.

Reference Sample

The reference sample is PEKK known by the brand name "OXPEKK" obtained from Oxford Performance Materials, Inc.

Elemental analysis was performed on SPEKK obtained in Synthesis Example 1, Synthesis Example 2, and Synthesis Example 3, and also on the PEKK of Reference sample, and the results are given in Table 1.

TABLE 1

|  | C (wt %) | H (wt %) | S (wt %) | Degree of Sulfonification (%) |
| --- | --- | --- | --- | --- |
| Reference | 67.3 | 3.7 | 0.3 or less | 0 |
| Synthesis Ex. 1 | 76.8 | 4.1 | 2.5 | 25.0 |
| Synthesis Ex. 2 | 76.0 | 4.1 | 2.8 | 28.3 |
| Synthesis Ex. 3 | 75.5 | 4.0 | 3.0 | 32.6 |

Table 1 shows that the degree of sulfonication of the SPEKK ranges from 25% to 32.6%.

Figure 2:
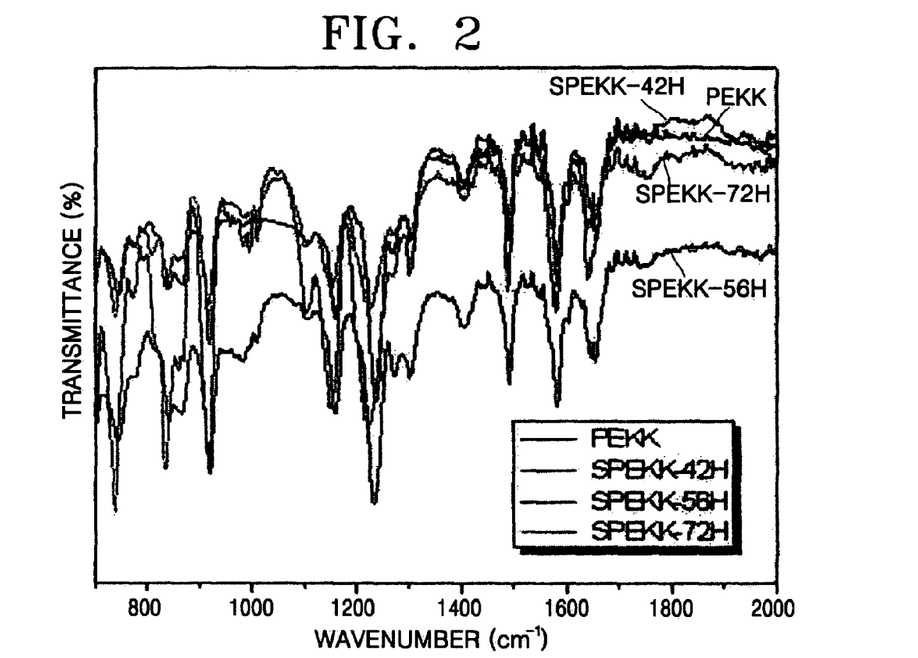
FIG. 2 shows the FT-IR spectrum of sulfonated poly(ether ketone ketone) (SPEKK) of Synthesis Example 1, Synthesis Example 2, and Synthesis Example 3.
Figure 3:
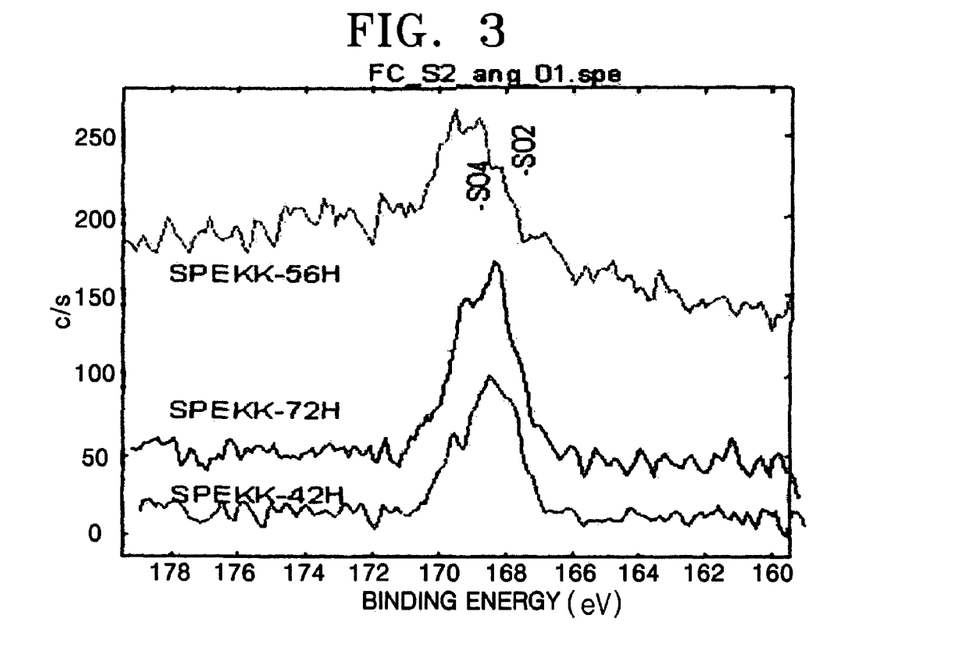
FIG. 3 shows the XPS data of the SPEKK of Synthesis Example 1, Synthesis Example 2, and Synthesis Example 3.

The SPEKK of Synthesis Example 1, Synthesis Example 2, and Synthesis Example 3 are subjected to FT-IR and XPS analyses and the results are given in FIG. 2 and FIG. 3.

In FIG. 2, the following FT-IR peaks are shown, which indicate the presence of the sulfonyl group in SPEKK.

1503 $cm^{-1}$ (aromatic C—C band split)

1210 $cm^{-1}$ (asymmetric O=S=O stretching)

1075 $cm^{-1}$ (symmetric O=S=O stretching)

FIG. 3 confirms that SPEKK is substituted by the sulfonyl group.

EXAMPLE 1

10 g (26 mmol) of the SPEKK obtained in Synthesis Example 3 (degree of sulfonication=32.6%) was dissolved in 90 g of dichloroacetic acid to obtain a SPEKK solution.

1.0 g (1.8 mmol) of PEGDMA was added dropwise to 10 g of the SPEKK solution and stirred. 0.05 g of benzoin ethyl ether as a polymerization initiator and 2.0 g (20.4 mmol) of phosphoric acid were sequentially added to the mixture. The mixture was then stirred for 2 hours to obtain a polymer electrolyte forming composition.

The polymer electrolyte forming composition was cast on a glass plate and a film was formed using a doctor blade. The resulting film was dried at 60° C. for 5 hours. The film was cured by exposing it to UV rays for 20 minutes to obtain a polymer electrolyte.

A fuel cell was fabricated using the polymer electrolyte membrane and an electrode of EFCG-S type available from E-TEK, which contains 10 wt % of Pt impregnated on carbon paper (loading amount: 0.6 mg/$cm^2$).

Figure 4:
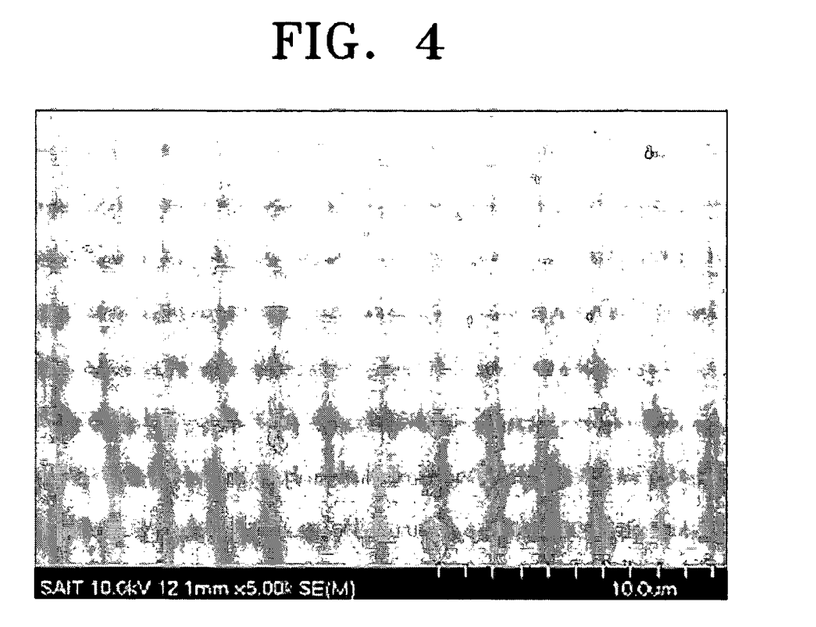
FIG. 4 shows a scanning electron microscopic (SEM) photograph of the SPEKK.
Figure 5:
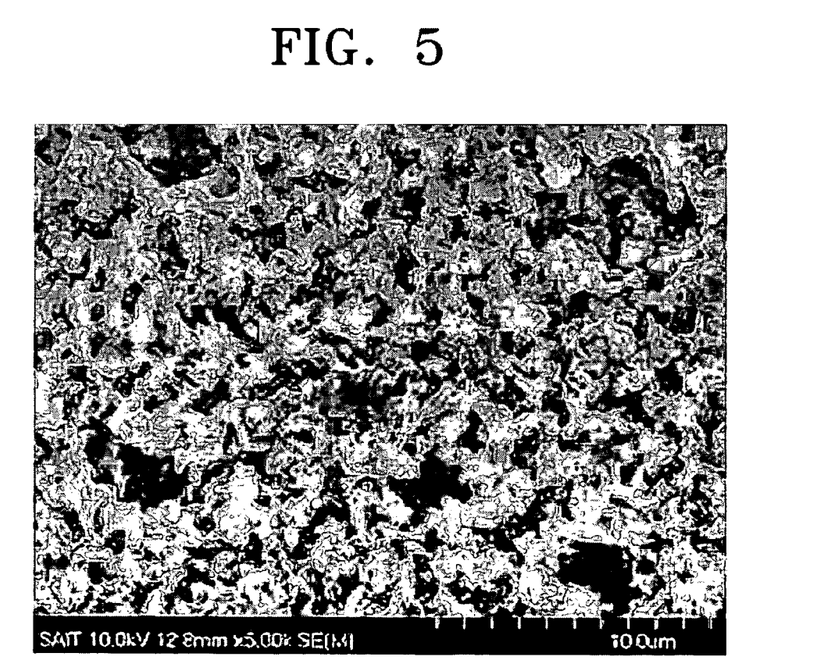
FIG. 5 shows a SEM photograph of the polymer electrolyte membrane of Example 1.
Figure 6:
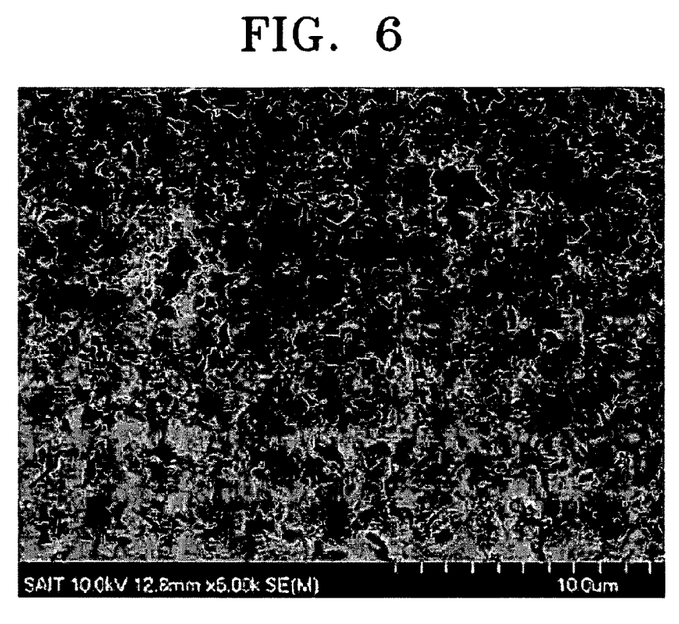
FIG. 6 shows a SEM photograph of the polymer electrolyte membrane of Example 1 swollen after being impregnated in water.

FIG. 4 is a scanning electron microscopic (SEM) photograph (×5000) of the SPEKK membrane obtained in Example 1. FIG. 5 is a SEM photograph (×5000) of the polymer electrolyte obtained in Example 1. FIG. 6 is a SEM photograph (×5000) of the polymer electrolyte membrane of FIG. 2 swollen by water.

It can be seen by comparing the membrane surface before swelling in water in FIG. 4 and FIG. 5 with the membrane surface after swelling in water in FIG. 6 that a pin hole free polymer electrolyte membrane was formed by swelling.

FIG. 4 shows the SPEKK membrane surface, which shows a typical thermoplastic polymer form. FIG. 5 shows that an interpenetrating network of pores is generated in the SPEKK membrane by a cross-linking agent. FIG. 6 shows that swelling causes the pores to draw closer.

EXAMPLE 2

Polymer electrolytes were prepared in the same manner as in Example 1 using the compositions and the processing conditions given in Table 2, and the ionic conductivity thereof was measured and also shown in Table 2.

TABLE 2

| Example # | SPEKK (g) | PEGDMA (g) | UV irradiation time (min) | Phosphoric acid (g) | Conductivity (S/cm @ r.t.) |
| --- | --- | --- | --- | --- | --- |
| 2-1 | 1 | 1 | 10 | 2 | $1.38 \times 10^{-4}$ |
| 2-2 | 1 | 1 | 10 | 1 | $2.45 \times 10^{-4}$ |
| 2-3 | 1 | 2 | 20 | 2 | $8.84 \times 10^{-4}$ |
| 2-4 | 1 | 2 | 10 | 2 | $3.20 \times 10^{-3}$ |
| 2-5 | 1 | 1 | 20 | 3 | $1.90 \times 10^{-2}$ |
| 2-6 | 1 | 1 | 10 | 3 | $5.54 \times 10^{-3}$ |

TABLE 2-continued

| Example # | SPEKK (g) | PEGDMA (g) | UV irradiation time (min) | Phosphoric acid (g) | Conductivity (S/cm @ r.t.) |
|---|---|---|---|---|---|
| 2-7  | 1 | 1 | 20 | 2 | $7.52 \times 10^{-3}$ |
| 2-8  | 1 | 2 | 10 | 1 | — |
| 2-9  | 1 | 2 | 20 | 1 | $7.35 \times 10^{-5}$ |
| 2-10 | 1 | 2 | 20 | 3 | $1.73 \times 10^{-2}$ |
| 2-11 | 1 | 1 | 20 | 1 | $6.66 \times 10^{-4}$ |
| 2-12 | 1 | 2 | 20 | 3 | $1.86 \times 10^{-2}$ |

Referring to Table 2, Example 2-5, Example 2-10 and Example 2-12 had relatively higher ionic conductivities. Example 2-10 and Example 2-12 were found to have a relatively low mechanical strength due to an excessive amount of phosphoric acid.

COMPARATIVE EXAMPLE 1

5 g of a solution of PBI in dimethylacetimide was cast on a glass plate, dried at room temperature for 30 min, and then dried in a drying oven at 120° C. for 1 hr. The glass plate was immersed in water, and the PBI film was removed and then dried in a vacuum oven at 60° C. for 8 hours. The PBI film was impregnated in 85% phosphoric acid in a drying oven at 60° C. for 2 hours, and its ionic conductivity was measured.

Figure 7:
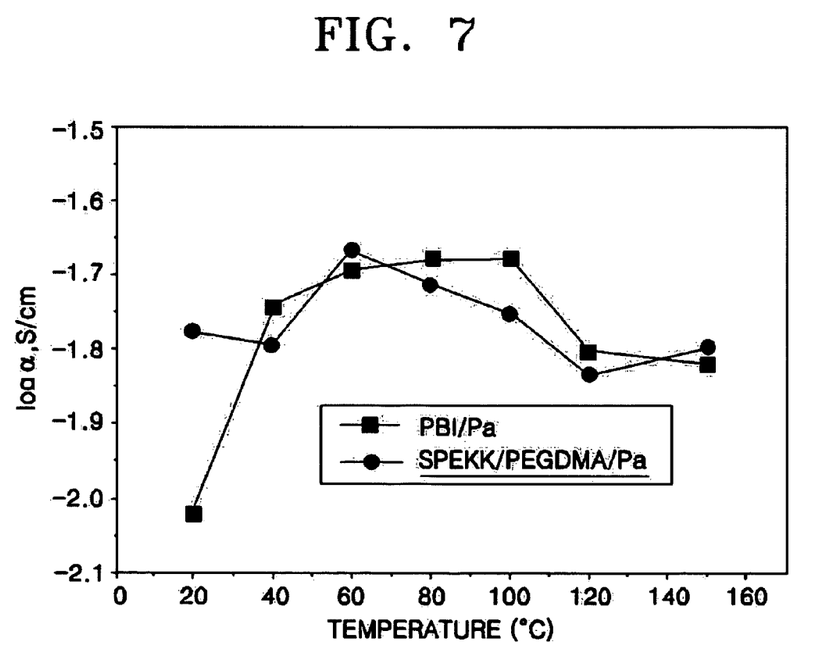
FIG. 7 shows a graph illustrating the relationship between ionic conductivity and temperature in the polymer electrolytes of Example 1 and Comparative Example 1.

The relationship between ionic conductivity and temperature in the polymer electrolytes of Example 1 and Comparative Example 1 was investigated and the results are illustrated in FIG. 7.

Referring FIG. 7, at room temperature the SPEKK/PEGDMA/Phosphoric acid (Pa) system of Example 1 has a higher ionic conductivity than the PBI/Pa system of Comparative Example 1. The ionic conductivities of Example 1 and Comparative Example 1 are directly proportional to the temperature, but the ionic conductivity of Example 1 decreases less at higher temperatures. At an operating temperature of 130° C. or higher, the two systems show similar values.

Figure 8:
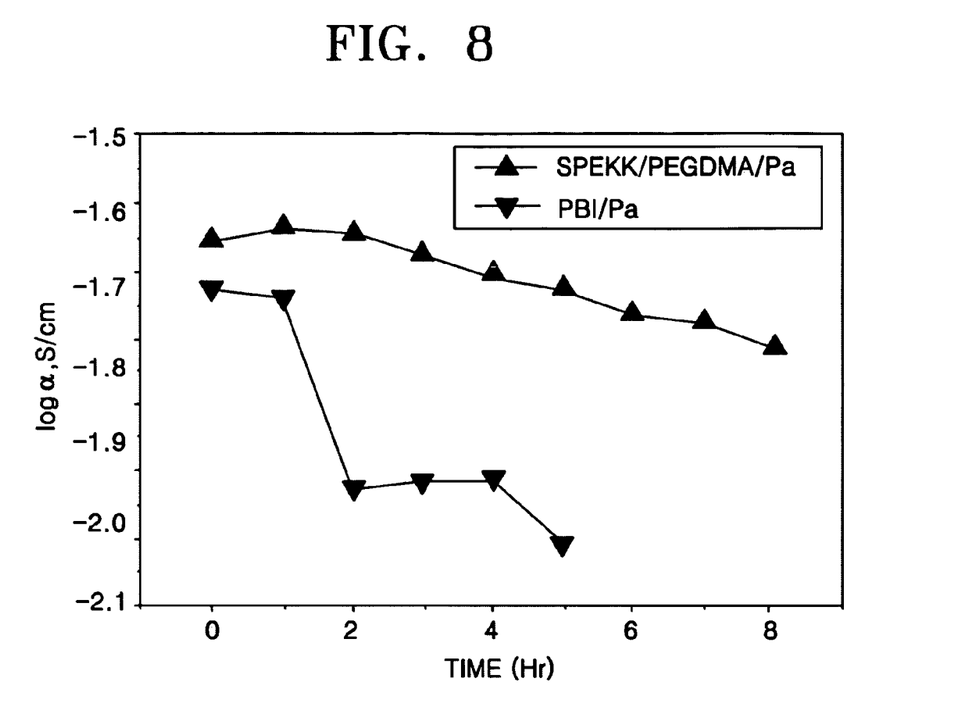
FIG. 8 shows a graph illustrating the relationship between ionic conductivity and time in the polymer electrolytes of Example 1 and Comparative Example 1.

FIG. 8 illustrates the relationship between ionic conductivity and time in the polymer electrolytes of Example 1 and Comparative Example 1. The ionic conductivity of the polymer electrolyte of Example 1 was measured at 130° C. and the ionic conductivity of the polymer electrolyte of Comparative Example 1 was measured at about 110° C.

Referring to FIG. 8, the ionic conductivity of Comparative Example 1 decreases when the system is operated at high temperatures for long periods due to the evaporation of moisture from the phosphoric acid and leakage of the phosphoric acid. Example 1 shows less decrease in ionic conductivity over time at high temperatures due to hydrophilic groups of the cross-linking agent and a network of pores.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A polymer electrolyte, comprising:
a product of a curing reaction between sulfonated polyether ketone ketone represented by Formula (1) and a cross-linking agent:

Formula (1)

where n is a number from 100-1,000,
wherein the cross-linking agent comprises at least one material selected from the group consisting of polyethyleneglycol diacrylate, polyethyleneglycol dimethacrylate, and polyethyleneglycol dimethyl ether, and
wherein the amount of the cross-linking agent is 80 to 250 parts by weight based on 100 parts by weight of the sulfonated polyether ketone ketone.

2. The polymer electrolyte of clam 1, further comprising:
an acid.

3. The polymer electrolyte of claim 2,
wherein the acid comprises at least one acid selected from the group consisting of phosphoric acid and a solid inorganic proton conductor; and
wherein the amount of the acid is about 3 to about 12 mol % based on the sulfonated polyether ketone ketone.

4. The polymer electrolyte of claim 1,
wherein the degree of sulfonication of the sulfonated polyether ketone ketone is about 30 to about 40 wt %; and
wherein the weight average molecular weight of the sulfonated polyether ketone ketone is about 60,000 to about 200,000.

* * * * *

UNITED STATES PATENT AND TRADEMARK OFFICE
CERTIFICATE OF CORRECTION

PATENT NO.        : 7,648,652 B2                                                   Page 1 of 1
APPLICATION NO. : 11/298576
DATED             : January 19, 2010
INVENTOR(S)       : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

Twenty-third Day of November, 2010

David J. Kappos
*Director of the United States Patent and Trademark Office*